Nov. 4, 1952    C. L. COOK ET AL    2,616,191
TRACTOR MOUNTED SNOWPLOW

Filed Jan. 10, 1947    2 SHEETS—SHEET 1

INVENTORS
CURTISS L. COOK
AUSTIN E. YOUNG
BY
ATTORNEYS

Nov. 4, 1952   C. L. COOK ET AL   2,616,191
TRACTOR MOUNTED SNOWPLOW
Filed Jan. 10, 1947   2 SHEETS—SHEET 2

INVENTORS
CURTISS L. COOK
AUSTIN E. YOUNG
BY
ATTORNEYS

Patented Nov. 4, 1952

2,616,191

UNITED STATES PATENT OFFICE 2,616,191

TRACTOR MOUNTED SNOWPLOW

Curtiss L. Cook and Austin E. Young, Syracuse, N. Y., assignors to Syracuse Chilled Plow Co., Inc., Syracuse, N. Y., a corporation of New York Application January 10, 1947, Serial No. 721,240

6 Claims. (Cl. 37—42)

The present invention relates generally to tractor mounted implements and is more particularly concerned with load engaging and moving machines, such as snow plows and the like.

The object and general nature of the present invention is the provision of a new and improved implement adapted to serve as a snow plow, scraper, or the like and to be mounted on a tractor and controlled by the power lift unit of the tractor. More particularly, it is a feature of this invention to provide a load engaging implement that is raised and lowered by connection with the vertically swingable drawbar of the tractor. Further, it is a feature of this invention to provide a scraper type of implement wherein the load engaging blade is pivotally connected with the supporting frame for movement about a generally vertical axis, with the adjacent portions of the frame shaped so as to extend in a generally horizontal plane when in operating position, whereby changes in the angularity or angular position of the blade does not effect the latter, the lower or cutting edge of the blade always remaining in a horizontal plane, irrespective of whether the blade is arranged in a transverse position or in an angled position.

Another feature of this invention is the provision of improved connecting means between the pusher frame and the tractor, providing for quick and easy connection to or disconnection from the tractor.

These and other objects and advantages of the present invention will be apparent to those skilled in the art after a consideration of the following detailed description, taken in conjunction with the accompanying drawings, in which.

Figures 1, 3:
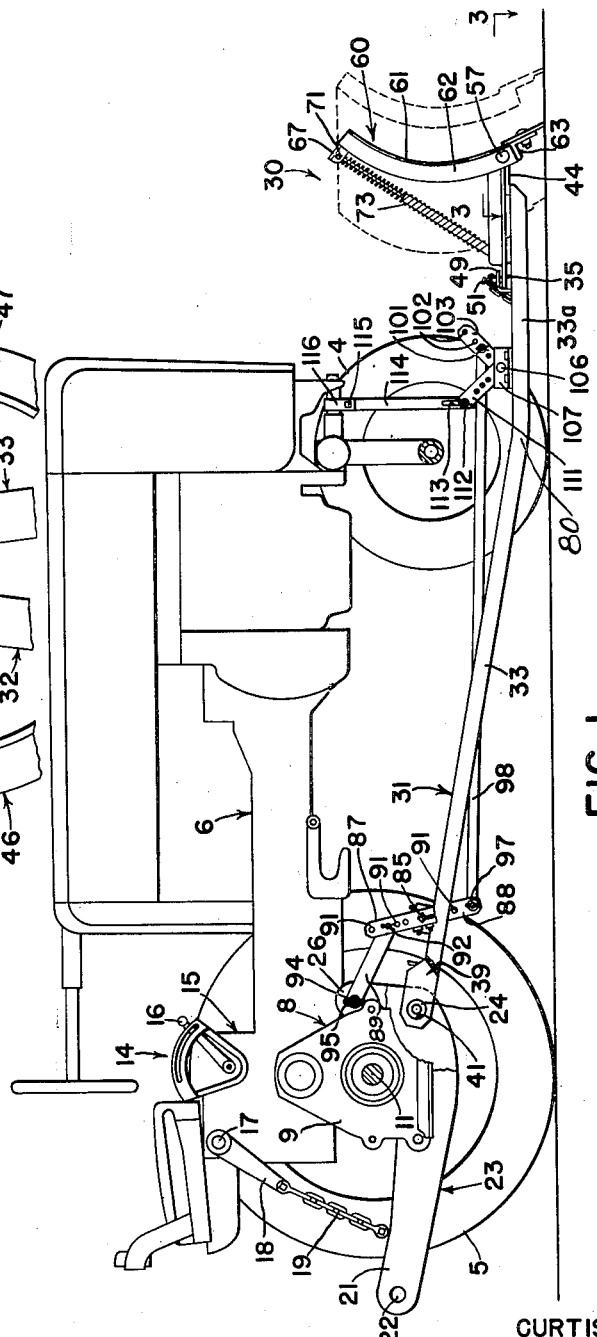
Figure 1 is a side view of a tractor mounted implement in which the principles of the present invention have been incorporated.
Figure 3 is a sectional view taken generally along the line 3—3 of Figure 1.
Figure 2:
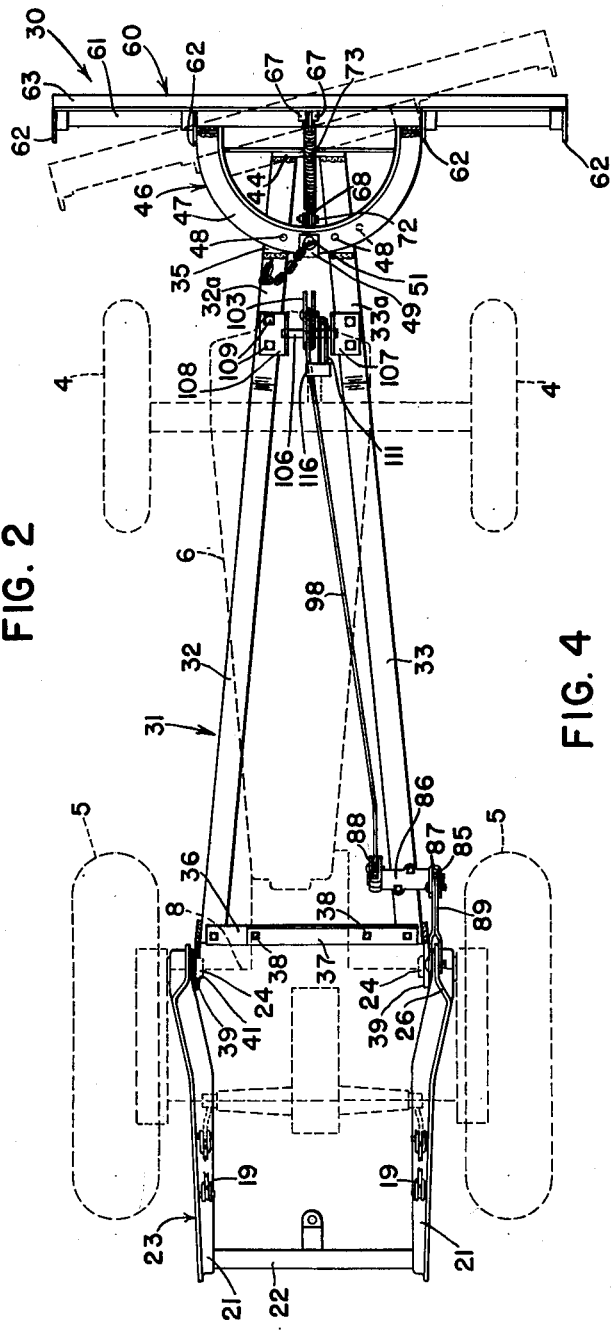
Figure 2 is a plan view of the implement shown in Figure 1.
Figure 4:
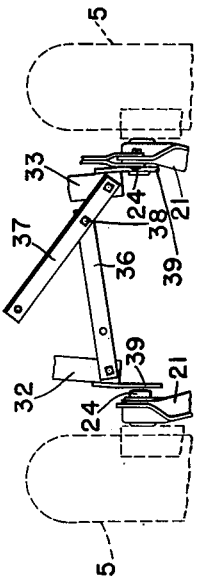
Figure 4 is a fragmentary view similar to Figure 2, showing the way in which the pusher frame may readily be attached to or disconnected from the tractor.

Referring now to the drawings, the tractor on which the implement of the present invention is adapted to be mounted is a farm tractor of the four wheel type and includes front wheels 4, rear wheels 5, supporting a tractor body 6 which includes a motor, and a rear axle structure 8, the latter including right and left hand drop axle housings 9 in which stub axle shafts 11 receiving the traction wheels 5 are journaled. The tractor also includes a power lift unit 14 which comprises a piston and cylinder structure 15, together with hydraulic apparatus including a control valve 16 whereby a rockshaft 17 that forms a part of the power lift unit 14 may be rocked in one direction or the other by power. The power lift unit 14 is similar, so far as the present invention is concerned, to the power lift unit shown in U. S. Patent 2,477,710, issued August 2, 1949, to Worstell, to which reference may be made if necessary. A pair of power lift arms 18 are fixed to opposite ends of the power lift rockshaft 17 and are connected by links 19 to the arms 21 that with a rear central section 22 make up a vertically swingable tractor drawbar 23. The forward ends of the arms are pivoted on a pair of trunnions or studs 24 that are carried at the lower forward portions of the drop housings 9. Also, each drawbar side member 21 includes a forward implement-operating arm 26, end of which is apertured at its upper end to receive a pin or stud. The studs 24 extend laterally inwardly beyond the drawbar side members 21 to receive other implements that may be attached to the tractor, such as a snow plow or the like.

The snow plow or scraper implement with which the present invention is more particularly concerned in indicated in its entirety by the reference numeral 30 and comprises an A-frame 31 that is made up of a pair of push bars 32 and 33, preferably in the form of angles, suitably connected together at their front ends by a cross strap 35 and at their rear ends by a pair of angles 36 and 37 the abutting flanges of which are secured together by bolts 38 or other suitable means. The strap 35 is welded or otherwise fixed to the front ends of the angles 32 and 33. An apertured lug 39 is secured as by welding to the rear end of each of the angle bars 32 and 33 and each lug 39 is apertured, as at 41, to receive the studs or trunnions that form the pivotal connection between the drawbar 23 and the tractor. The implement frame bars 32 and 33 converge forwardly and at their forward ends are connected together as by being welded to a central plate 44 which is apertured to receive a pin 45 by which a blade-supporting circle member 46 is adapted to be swingably connected to the frame 31 for movement relative thereto about a vertical axis. The blade-supporting member, circle member 46, includes an arcuate member 47, preferably in the form of an angle, having a plurality of openings 48. The arcuate section 47 moves within the upper and lower portions of a yoke 49 that is welded to the cross strap 35. The yoke 49 is apertured and receives a pin 51 which may be inserted in any one of the openings 48 for the purpose of holding the blade-supporting circle member 46 in position. The circle member 46 also includes a pair of laterally spaced sleeve sections 55 and 56 which receive pins 57 by which a blade unit 60 is pivotally connected to the circle member 46 for movement about a generally transverse axis. The blade member 60 includes a blade proper, indicated at 61, and reenforcing or backing angles 62 and 63 suitably fastened together, as by welding, to form a frame or support for the blade 61. The flanges of the two laterally inwardly vertical angles 62 are apertured to receive the pins 57, and the upper angle 63 carries a pair of angle lugs 67. A pair of similar lugs 68 are fixed to the central portion of the circle member 47. These lugs are apertured to receive pins 71 and 72 that connect a spring member 73 to the frame and to the upper portion of the blade. The spring member 73 preferably comprises telescopically associated tube and rod members and an encircling tension spring, the force of which serves to hold the blade 61 in a normal operating position, but if the lower portion should strike a stone or other obstruction, the blade 61 is free to swing forwardly about the axis defined by the pins 57 until the obstruction is passed, after which the spring unit 73 will return the blade to its normal position without attention on the part of the operator.

It will be noted from Figure 1 that the front portions 32a and 33a of the frame angles 32, 33 are bent, as at 80, so as to dispose the forward portions in a generally horizontal plane when the scraper 61 is in operating position. By virtue of this arrangement, when the blade 61 is swung about its pivot axis, as at 45, the lower edge of the blade remains in a horizontal plane, irrespective of whether the blade occupies a transverse position or an angled position.

The front end of the scraper frame 31 is raised and lowered by a connection with the tractor drawbar 23. To this end, a rockshaft 85 is mounted in a journal boxing 86 that is bolted to the right hand frame bar, adjacent its rear end. A pair of arm members 87 and 88 are fixed to opposite ends of the rockshaft 85. The arm 87 is connected by means of a link 89 to the tractor drawbar arm 26. Preferably, the arm 87 is provided with a plurality of apertures 91 to receive a pin 92 that connects the forward end of the link 89 to the arm 87. By disposing the pin 92 in different openings, the ratio of rockshaft movement to drawbar movement may be changed as desired. The rear end of the link 89 is connected to the drawbar arm 26 by means of a pin 94 which is held in place by a detachable member 95.

The other arm 88, which preferably is of a construction substantially exactly like the arm 87 mentioned above, is connected by a pivot pin 97 to a forwardly extending link 98, the forward end of which is connected by a pivot pin 101 which is disposed in one of the openings 102 in an arm 103 that is fixed to the central portion of a rockshaft 106 that is journaled in a pair of bearing brackets 107 and 108 bolted, as at 109, to the front portions of the angles 32 and 33, preferably to the horizontal portions 33a thereof. A second arm 111 is fixed to the shaft 106 and at its outer end carries a pin 112 that is received in a slot 113 formed in an upwardly extending link 114. The upper end of the latter link is connected by a pivot 115 to a yoke 116 that is fixed to or engaged with an adjacent portion of the tractor body. It will be noted that the arms 87, 88, 103 and 111 are of substantially identical construction, each including pin-receiving openings and a plurality of other openings receiving other pins, connecting links or other members thereto. By placing the pins and other connectors in the proper openings, the desired ratios of movements are secured.

The operation of the present invention is believed to be clear from the above description.

In mounting the implement on a tractor, the frame 31 is first made ready for attachment by removing one of the bolts 38 and swinging one of the angles 36 or 37 forwardly so as to bring the attaching lugs 39 closer together to permit their passing into position between the tractor studs 24. The tractor is driven forwardly over the frame structure until the tractor is in a position to permit placing one of the apertured lugs 39 over the associated drawbar trunnion and then lifting the other side of the frame up into position. Then by swinging the angle, 36 or 37, back into position by pivoting the same on the bolt 38, the lugs 39 are shifted laterally so as to engage positively over the drawbar trunnions. Replacement of the bolt 38 that was removed initially serves to hold the pusher frame bars 32 and 33 at the proper spaced apart distance to insure retaining the pusher frame 31 in engagement with the drawbar trunnions 24.

The yoke 116 is next engaged with a convenient part of the tractor, and when this is done the snow plow is connected with the tractor to be propelled and operated thereby. By moving the valve lever 16 in one direction or the other, the drawbar 23 may be raised or lowered. This movement acts through the arm 26 and link 89 to rock the rear rockshaft 85 and its associated arm 88. Movement of the latter member acts through the forwardly extending link 98 against the arm 103, movement of which rocks the shaft 106, thereby serving to raise and lower the front end of the implement frame and the blade unit 60 thereon. Since the portions 32a and 33a are horizontal when the unit is in operating position, the lower edge of the cutting blade always remains in a horizontal position irrespective of changes in its angularity with respect to the line of advance.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a load moving device adapted to be mounted on a tractor of the type having a vertically swingable drawbar at the rear of the tractor and power means for operating said drawbar, an A-frame, means pivotally connecting the rear portion of said A-frame with the tractor, a motion transmitting member pivotally mounted on one portion of said A-frame, means connecting said member with said tractor drawbar, a second motion transmitting member swingably mounted on the front portion of said A-frame, means connecting said first and second motion transmitting members, and means for connecting said second motion transmitting member with the forward portion of the tractor, whereby swinging of said tractor drawbar acts through said motion transmitting members and associated parts for raising and lowering the front portion of said A-frame, and a load engaging element carried by the forward portion of said A-frame.

2. In an implement adapted to be attached to a tractor carrying a pair of generally transversely directed studs, a frame construction comprising generally fore and aft extending members, the ends of which are movable toward and away from one another, and collapsible connecting means connected with the end portions of said members and providing for shifting the ends thereof laterally so as to accommodate bringing said ends into position relative to said attaching studs, said ends being apertured to receive said studs, and said collapsible connecting means being adapted to be connected so as to hold said ends in the proper spaced relation to retain them on said studs.

3. In an implement adapted to be attached to a tractor having a pair of laterally inwardly directed attaching studs, a frame construction comprising a pair of generally longitudinally extending members, the rear ends of which are shiftable toward and away from one another and carry apertured attaching lugs adapted to receive said studs, a pair of cross bars, each connected at its outer end with one of said frame bars and having apertured overlapping sections with detachable bolt means connecting said apertured sections, one of said bolt means being removable so as to accommodate angular displacement of one of said cross bars relative to the other so as to draw the ends of said frame bars closer together to cause them to clear said studs when attaching the frame to the tractor, one of said apertured lugs being adapted to be mounted on the associated stud and the other apertured lug being adapted to receive the stud associated therewith when said frame is in the proper position between said studs and said cross bars are swung into a position to cause said apertured lugs to separate when mounted on said studs, thereby holding the rear ends of said frame bars in the proper laterally spaced position to be retained on said studs, and said removable bolt means being reattachable after said frame bars are mounted on said studs for holding said frame bars in the aforesaid laterally spaced position.

4. A load moving implement adapted to be mounted on a tractor of the type having a rear axle including a pair of laterally spaced drop housings, each having a laterally inwardly extending stud, said implement comprising a main frame having a pair of rearwardly extending apertured lugs adapted to receive and pivotally mount said frame on said studs, means for shifting said apertured lugs toward and away from one another to facilitate attachment to and detachment from said studs, a load engaging element carried at the front of said frame, and means acting between said tractor and said frame for raising and lowering said load engaging element relative to the tractor.

5. A load moving implement adapted to be mounted on a tractor of the type having a rear end construction including a pair of laterally spaced apart, transversely extending studs, said implement comprising a main frame having a pair of rearwardly extending frame members, the rears of which are adapted to be shifted laterally one relative to the other, apertured lugs carried rigidly by the rear ends of said frame members, respectively, and adapted to receive and pivotally mount said frame on said studs, and means acting between said frame members for shifting the rear portions of said frame members and said apertured lugs toward and away from one another to facilitate attachment to and detachment from said studs.

6. A load-moving implement as defined in claim 5, further characterized by said shifting means comprising a pair of relatively movable cross bars acting between said frame members adjacent said apertured lugs for moving the lug-carrying ends of said frame members toward and away from one another.

CURTISS L. COOK.
AUSTIN E. YOUNG.

REFERENCES CITED

The following references are of record in the file of this patent:

UNITED STATES PATENTS

| Number | Name | Date |
|---|---|---|
| 1,423,796 | Hamann | July 25, 1922 |
| 1,442,796 | Detwiler | Jan. 23, 1923 |
| 1,636,276 | Benjamin et al. | July 19, 1927 |
| 1,923,412 | Bacon | Aug. 22, 1933 |
| 1,977,817 | Bird | Oct. 23, 1934 |
| 2,254,360 | Frudden et al. | Sept. 2, 1941 |
| 2,307,655 | Arps | Jan. 5, 1943 |
| 2,313,534 | Gledhill | Mar. 9, 1943 |
| 2,477,710 | Worstell | Aug. 2, 1949 |

FOREIGN PATENTS

| Number | Country | Date |
|---|---|---|
| 734,062 | France | July 25, 1932 |